US011138142B2

United States Patent
Lin et al.

(10) Patent No.: US 11,138,142 B2
(45) Date of Patent: Oct. 5, 2021

(54) ADAPTIVE INTERFACE CIRCUIT

(71) Applicant: REALTEK SEMICONDUCTOR CORPORATION, Hsinchu (TW)

(72) Inventors: Chia-Hung Lin, New Taipei (TW); Min-Yu Tseng, Kaohsiung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 102 days.

(21) Appl. No.: 16/747,746

(22) Filed: Jan. 21, 2020

(65) Prior Publication Data
US 2020/0242069 A1 Jul. 30, 2020

(30) Foreign Application Priority Data
Jan. 28, 2019 (TW) ................. 108103173

(51) Int. Cl.
*G06F 13/42* (2006.01)
*G06F 13/16* (2006.01)
*G06F 13/40* (2006.01)

(52) U.S. Cl.
CPC ...... *G06F 13/4221* (2013.01); *G06F 13/1668* (2013.01); *G06F 13/4282* (2013.01); *G06F 2213/0026* (2013.01); *G06F 2213/0042* (2013.01); *G06F 2213/28* (2013.01)

(58) Field of Classification Search
CPC ............. G06F 13/4221; G06F 13/4282; G06F 13/1684
See application file for complete search history.

(56) References Cited

U.S. PATENT DOCUMENTS
2018/0121106 A1   5/2018  Kim

FOREIGN PATENT DOCUMENTS
CN    108021334 A    5/2018

OTHER PUBLICATIONS

OA letter of counterpart TW application of application No. 108103173 dated Jan. 17, 2020. Summary of TW OA letter: Claims 1-10 are rejected as being anticipated by the cited reference 1 (CN108021334A, also published as US2018121106A1).
NVM Express.org "NVM Express Base Specification NVM-Express-1_3c-2018.05.24-Ratified", May 24, 2018, NVM Express.org.
Curtis E. Stevens "Information technology—USB Attached SCSI (UAS) UAS Spec" Mar. 9, 2010, dpANS Project American National Standard.

*Primary Examiner* — Getente A Yimer
(74) *Attorney, Agent, or Firm* — WPAT, PC

(57) ABSTRACT

Disclosed is an adaptive interface circuit for connecting a USB interface and a PCIe interface. The adaptive interface circuit includes a UAS protocol processing circuit, a data buffer, and an NVMe protocol processing circuit. The UAS protocol processing circuit receives a UAS command from a host via the USB interface and transmits a write-ready signal to the host according to the UAS command so that the host transmits host data to the data buffer according to the write-ready signal; the UAS protocol processing circuit also provides the UAS command to the NVMe protocol processing circuit. The NVMe protocol processing circuit generates X NVMe command(s) according to the UAS command; afterwards the NVMe protocol processing circuit starts transmitting X doorbell signal(s) to a storage device via the PCIe interface so as to let the storage device retrieve the host data from the data buffer according to the X NVMe command(s).

18 Claims, 7 Drawing Sheets

ADAPTIVE INTERFACE CIRCUIT

BACKGROUND OF THE INVENTION

1. Field of the Invention

The present invention relates to an interface circuit, especially to an adaptive interface circuit.

2. Description of Related Art

The USB (Universal Serial Bus) to PCIe (Peripheral Component Interconnect Express) adaptive interface technique follows the UAS (USB Attached SCSI (Small Computer System Interface)) protocol and NVMe (Non-Volatile Memory Express) protocol. The two protocols are described in brief below.
(1) UAS protocol: This protocol specifies the way to exchange data between a USB host (e.g., a personal computer) and a USB device (i.e., a USB-to-PCIe adapter functioning as a USB device here), the way including:
  (i) the USB host (or a UAS initiator port) transmitting a COMMAND IU (Command Information Unit) to the USB device;
  (ii) after the USB device (or a UAS target port) is available to execute instructions, the USB device replying to the USB host with a WRITE/READ READY IU and then the both sides starting exchanging data; and
  (iii) after the data exchange is finished, the USB device transmitting a SENSE IU to the USB host to indicate that the COMMAND IU has been executed.
(2) NVMe protocol: This protocol specifies the way to exchange data between an NVMe host (i.e., a USB-to-PCIe adapter functioning as an NVMe host here) and an NVMe controller (e.g., the NVMe controller of an NMVe storage device), the way including:
  (i) the NVMe host preparing one or more instructions and putting them in a submission queue;
  (ii) the NVMe host updating a submission queue tail doorbell signal of the NVMe controller;
  (iii) the NVMe controller retrieving one or more instructions from the submission queue of the NVMe host;
  (iv) the NVMe controller executing the retrieved instruction(s);
  (v) after the NVMe controller finishing executing the retrieved instruction(s), the NVMe controller transmitting the result(s) to a completion queue of the NVMe host;
  (vi) using a pin-based interrupt (INTx)/message signaled interrupt/MSI-X to notify the NVMe host that the retrieved instruction(s) has been executed;
  (vii) the NVMe host processing the result(s) in the completion queue; and
  (viii) updating a completion queue head doorbell signal of the NVMe controller.

Regarding the circumstance of a USB host writing data into an NVMe storage device, the data transmission procedures of the current USB-to-PCIe adaptive interface technique are as follows: after the USB host starts transmitting data to a USB-to-PCIe adapter functioning as an NVMe host, the USB-to-PCIe adapter transmitting a doorbell signal to the NVMe controller of the NVMe storage device; and the NVMe controller retrieve one or more instructions from the USB-to-PCIe adapter according to the doorbell signal and execute the retrieved instruction(s) which request(s) the NVMe controller to retrieve the transmitted data kept in the USB-to-PCIe adapter. Since a general NVMe controller needs time (e.g., 5 µs~50 µs) to respond to the notification of an NVMe write-in instruction, it takes a few moments before the NVMe controller starts retrieving the NVMe write-in instruction and executing it (i.e., retrieving the data of the USB host from the USB-to-PCIe adapter); in addition, during the NVMe controller's responding time, the USB-to-PCIe adapter may have already prepared at least some data of the USB host for the NVMe controller to retrieve; in light of the above, if the NVMe controller could retrieve and execute the instruction(s) from the USB-to-PCIe adapter earlier or the USB-to-PCIe adapter (i.e., the NVMe host) could start transmitting a doorbell signal to the NVMe controller before the USB host finishing transmitting a complete piece of data to the USB-to-PCIe adapter, the write-in process will be accelerated and the waste of USB and PCIe transmission bandwidth due to the NVMe controller's responding time will be reduced.

SUMMARY OF THE INVENTION

An object of the present disclosure is to provide an adaptive interface circuit. Compared with the prior art, the adaptive interface circuit can accelerate the data access operation and reduce the waste of transmission bandwidth.

An embodiment of the adaptive interface circuit of the present disclosure is for coupling a Universal Serial Bus (USB) interface with a Peripheral Component Interconnect Express (PCIe) interface, the adaptive interface circuit including a USB Attached SCSI (UAS) protocol processing circuit, a data buffer, and a Non-Volatile Memory Express (NVMe) protocol processing circuit. The UAS protocol processing circuit is configured to receive a UAS command from a host via the USB interface and transmit a write-ready signal to the host in response to the UAS command so as to let the host transmit host data to the data buffer according to the write-ready signal; the UAS protocol processing circuit is also configured to provide the UAS command to the NVMe protocol processing circuit. The data buffer is configured to keep the host data. The NVMe protocol processing circuit is configured to generate X NVMe command(s) according to the UAS command; and the NVMe protocol processing circuit is also configured to start transmitting X doorbell signal(s) to a storage device via the PCIe interface before the host receives the write-ready signal so as to let the storage device retrieve the host data from the data buffer according to the X NVMe command(s) earlier, wherein the X NVMe command(s) are related to the X doorbell signal(s) respectively and the X is a positive integer.

Another embodiment of the adaptive interface circuit of the present disclosure is for coupling a first interface with a second interface, the adaptive interface circuit including a first protocol processing circuit, a data buffer, and a second protocol processing circuit. The first protocol processing circuit is configured to receive a first protocol command from a first device via the first interface and transmit a write-ready signal to the first device in response to the first protocol command so as to let the first device transmit first device data to the data buffer according to the write-ready signal; the first protocol processing circuit is also configured to provide the first protocol command to the second protocol processing circuit. The data buffer is configured to keep the first device data. The second protocol processing circuit is configured to generate X second protocol command(s) according to the first protocol command; and the second protocol processing circuit is also configured to start transmitting at least one doorbell signal to a second device via the second interface before the first device receives the write-ready signal so as to let the second device retrieve the first device data from the data buffer according to the X second protocol command(s) earlier, wherein the X is a positive integer.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 3b shows an exemplary implementation of the data buffer of FIG. 3a.

DETAILED DESCRIPTION OF THE PREFERRED EMBODIMENTS

The adaptive interface circuit of the present disclosure in comparison with the prior art can accelerate the data access operation and thereby reduce the waste of transmission bandwidth.

Figure 1:
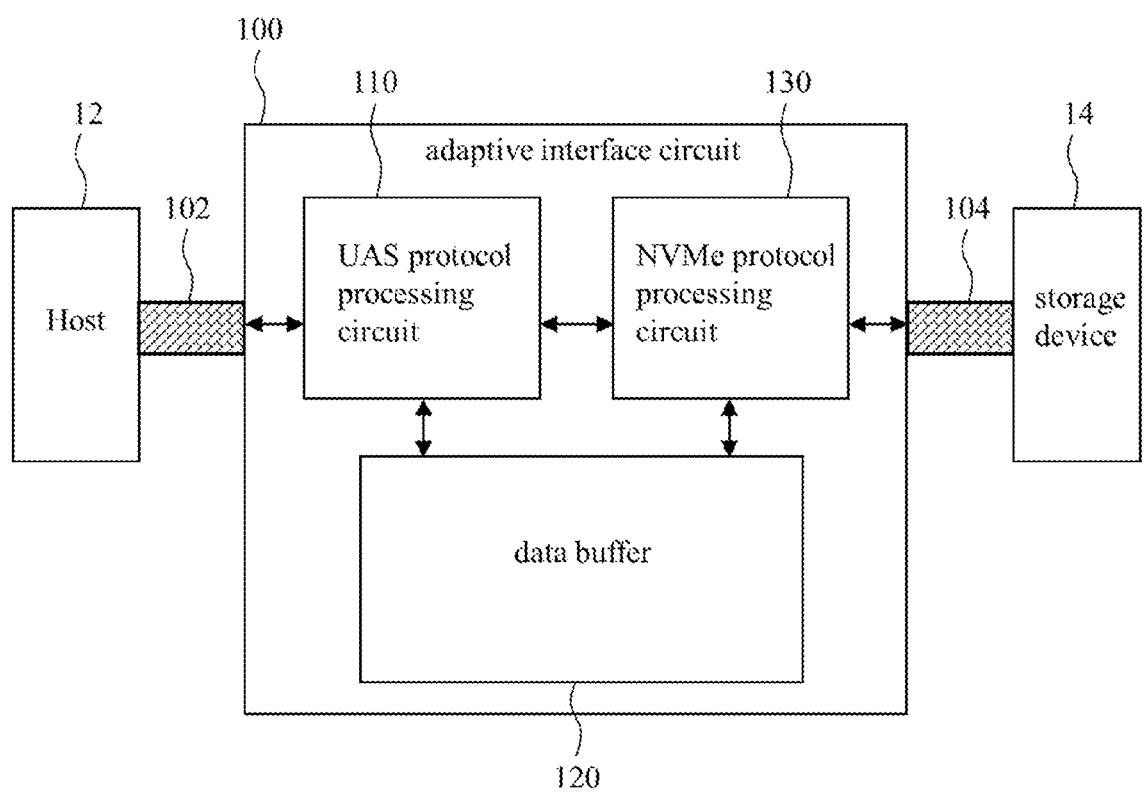
FIG. 1 shows an embodiment of the adaptive interface circuit of the present invention.
Figure 2:
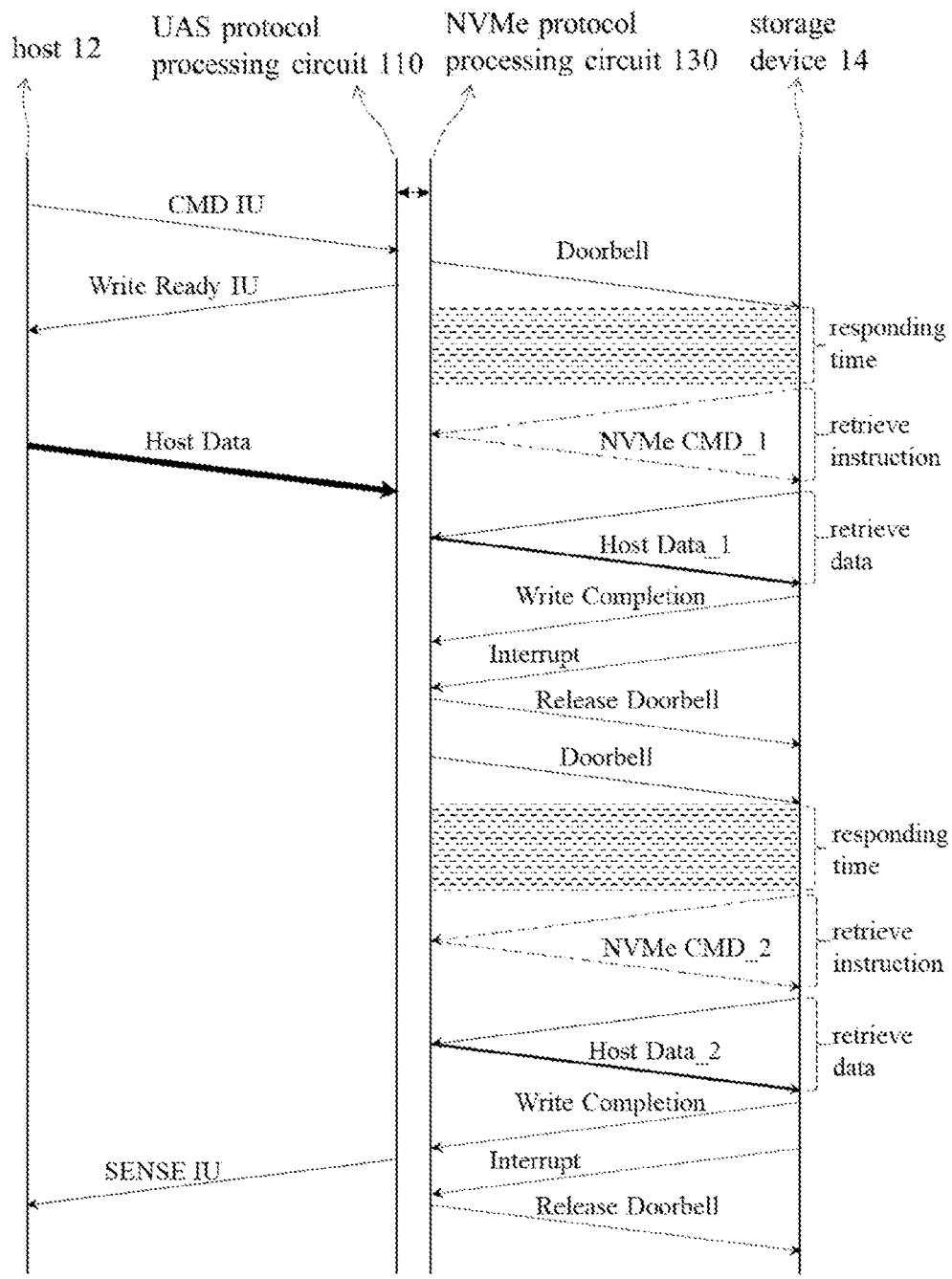
FIG. 2 illustrates the communication procedures of the adaptive interface circuit of FIG. 1.

FIG. 1 shows an embodiment of the adaptive interface circuit of the present disclosure; FIG. 2 illustrates the communication procedures of the adaptive interface circuit 100 of FIG. 1, wherein the vertical direction of FIG. 2 can be deemed a time axis. The adaptive interface circuit 100 physically and electrically couples a first interface 102 with a second interface 104, and includes a first protocol processing circuit 110 (e.g., a UAS (USB Attached SCSI) protocol processing circuit), a data buffer 120, and a second protocol processing circuit 130 (e.g., an NVMe (Non-Volatile Memory Express) protocol processing circuit). The first protocol processing circuit 110 is configured to receive a first protocol command (CMD IU) from a first device 12 (e.g., a host such as a personal computer) via the first interface 102 and to transmit a write-ready signal (Write Ready IU) to the first device 12 in response to the first protocol command so as to let the first device 12 transmit first device data (Host Data) to the data buffer 120 via the first protocol processing circuit 110. The first protocol processing circuit 110 is also configured to provide the first protocol command to the second protocol processing circuit 130. The data buffer 120 is configured to keep the first device data. The second protocol processing circuit 130 is configured to generate X second protocol command(s) according to the first protocol command (e.g., splitting the first protocol command to generate the X second protocol command(s)), in which the X is a positive integer. The second protocol processing circuit 130 is also configured to start transmitting at least one doorbell signal (Doorbell) to a second device 14 via the second interface 104 before the first device 12 receives the write-ready signal, which allows the second device 14 to retrieve the first device data from the data buffer 120 according to the X second protocol command(s) earlier and thereby reduces the waste of transmission bandwidth due to the responding time of the second device 14.

In an exemplary implementation based on the above, each of the X second protocol command(s) relates to a doorbell signal; therefore, the X second protocol command(s) relate(s) to X doorbell signal(s) respectively. The second protocol processing circuit 130 transmits one doorbell signal to the second device 14 according to one second protocol command, and then the second device 14 retrieves the second protocol command from the adaptive interface circuit 100 according to the doorbell signal and executes this command in order to obtain at least a part of the first device data (e.g., Host Data_1/Host Data_2 of FIG. 2). In an exemplary implementation, if the communication protocol between the adaptive interface circuit 100 and the second device 14 permits, the X second protocol command(s) relate(s) to M doorbell signal(s) while the M is a positive integer not greater than the X (e.g., M<X); accordingly, one doorbell signal may relate to one or more second protocol commands. In an exemplary implementation, before the first protocol processing circuit 110 transmits the write-ready signal, the second protocol processing circuit 130 starts transmitting at least one doorbell signal to the second device 14. In an exemplary implementation, after the second protocol processing circuit 130 receives the first protocol command, the second protocol processing circuit 130 immediately starts transmitting the at least one doorbell signal to the second device 14 regardless of whether the first protocol processing circuit 110 has already transmitted the write-ready signal. For a better understanding the first interface 102 is a USB (Universal Serial Bus) interface 102, the second interface 104 is a PCIe (Peripheral Component; Interconnect Express) interface 104, the first device 12 is a host 12 (e.g., a personal computer), the first device data is host data, the second device 14 is a storage device 14 (e.g., a solid-state drive (SSD)), the first protocol processing circuit 110 is a UAS (USB Attached SCSI (Small Computer System Interface)) protocol processing circuit 110, the second protocol processing circuit 130 is an NVMe (Non-Volatile Memory Express) protocol processing circuit 130, the first protocol command is a UAS command, and each of the X second protocol command(s) is an NVMe command in the following description; however, the implementation scope of the present invention is not limited thereto.

Figure 3A:
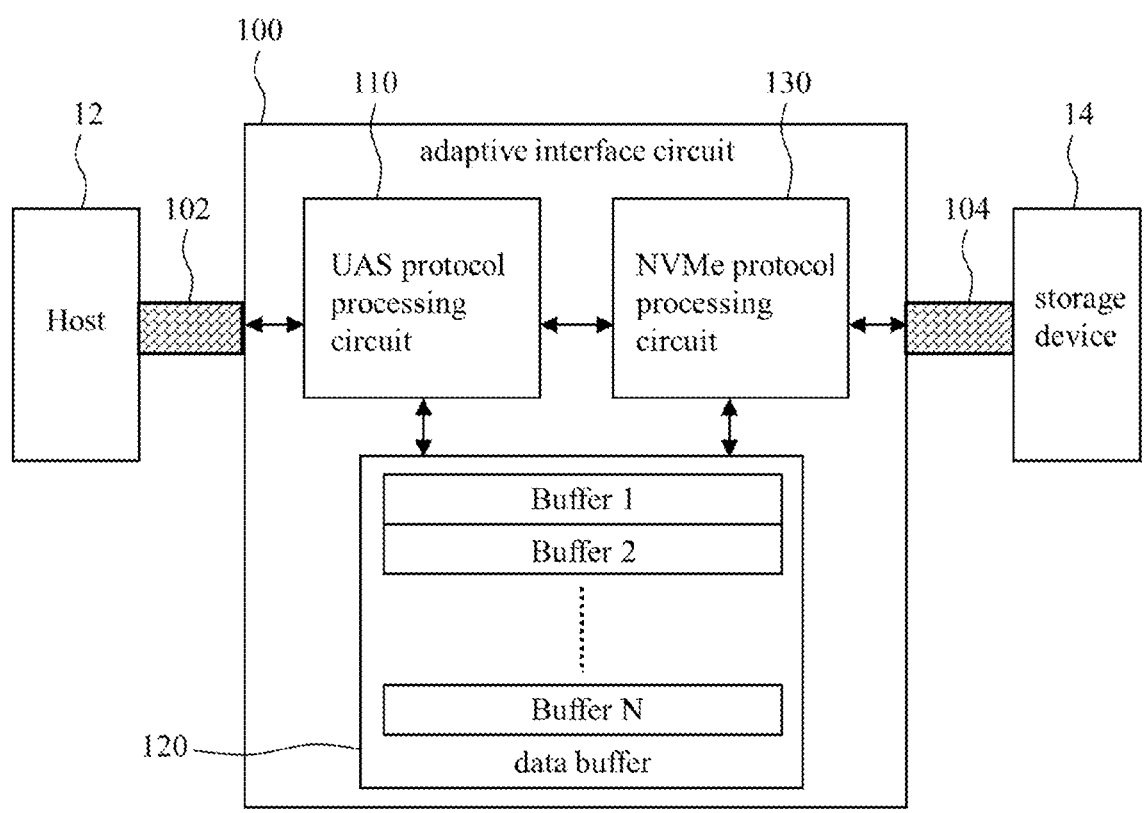
FIG. 3a shows an embodiment of the data buffer of FIG. 1.
Figure 3B:
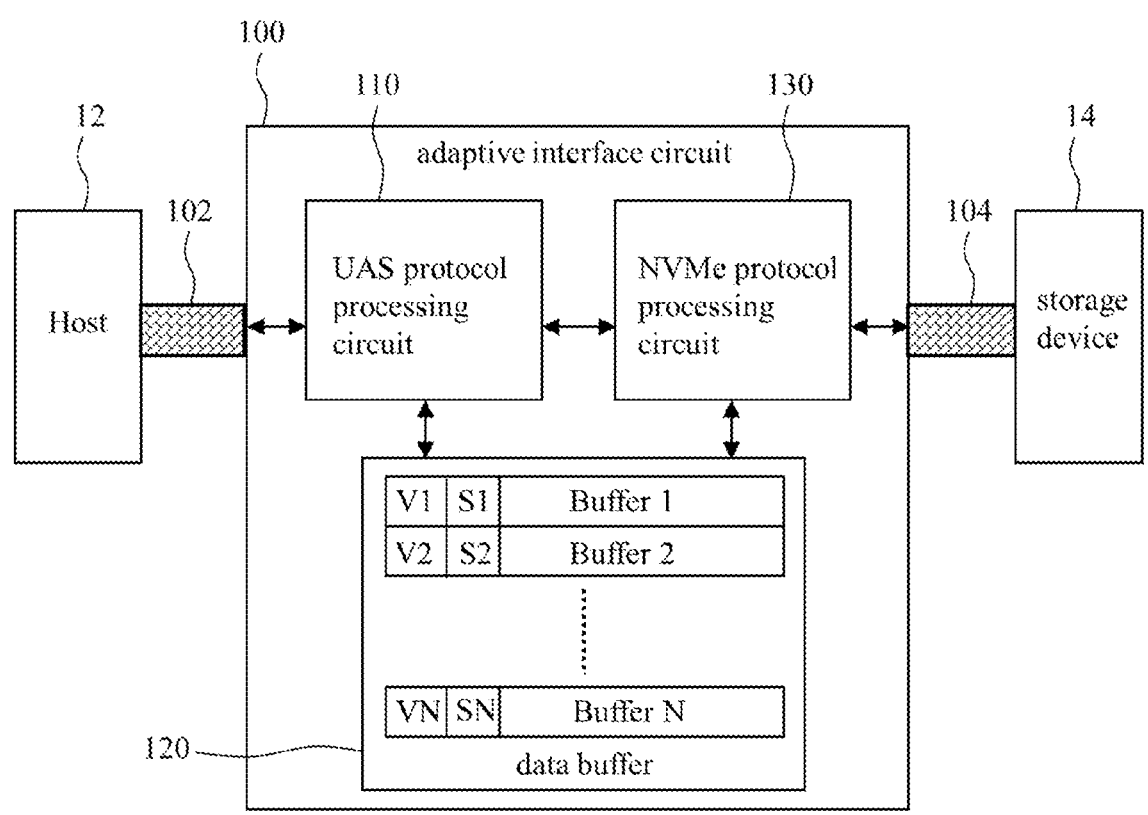

FIG. 3a shows an embodiment of the data buffer 120 of FIG. 1. The data buffer 120 of FIG. 3a includes N storage spaces (i.e., Buffer 1~Buffer N), in which the N is an integer greater than one. The UAS protocol processing circuit 110 and the NVMe protocol processing circuit 130 can detect the usage state of each storage space for utilization. For instance, as shown in FIG. 3b and Table 1 below, each storage space is tagged with an effective flag (i.e., $V_K$, in which the suffix K is a positive integer not greater than the N and thus $V_K$ can be one of $V_1$~$V_N$) and a transmission flag (i.e., $S_K$, in which the suffix K is a positive integer not greater than the N and thus $S_K$ can be one of $S_1$~$S_N$) that are indicative of the usage state of the storage space. The first value (e.g., 0) of $V_K$ indicates that a $K^{th}$ storage space of the N storage spaces is not occupied by to-be-retrieved data (i.e., at least a part of the host data); the second value (e.g., 1) of $V_K$ indicates that the $K^{th}$ storage space is occupied. The first value (e.g., 0) of $S_K$ indicates that the $K^{th}$ storage space is not access-pending, which means that the $K^{th}$ storage space is not related to any of the X NVMe command(s) or a doorbell signal associated with an NVMe command for retrieving the data of the $K^{th}$ storage space has been transmitted to the storage device 14; the second value (e.g., 1) of $S_K$ indicates that the $K^{th}$ storage space is access-pending, which means that the $K^{th}$ storage space is related to one of the X NVMe command(s) and a doorbell signal associated with this NVMe command is not transmitted to the storage device 14 yet. X storage space(s) of the N storage spaces are related to the X NVMe command(s) one-on-one.

TABLE 1

| $V_K$ | $S_K$ | usage state of storage space |
|---|---|---|
| 0 | 0 | having no to-be-retrieved data; not access-pending |
| 0 | 1 | having no to-be-retrieved data; access-pending |
| 1 | 1 | having to-be-retrieved data; access-pending |
| 0 | 0 | having no to-be-retrieved data; not access-pending |

Figure 4:
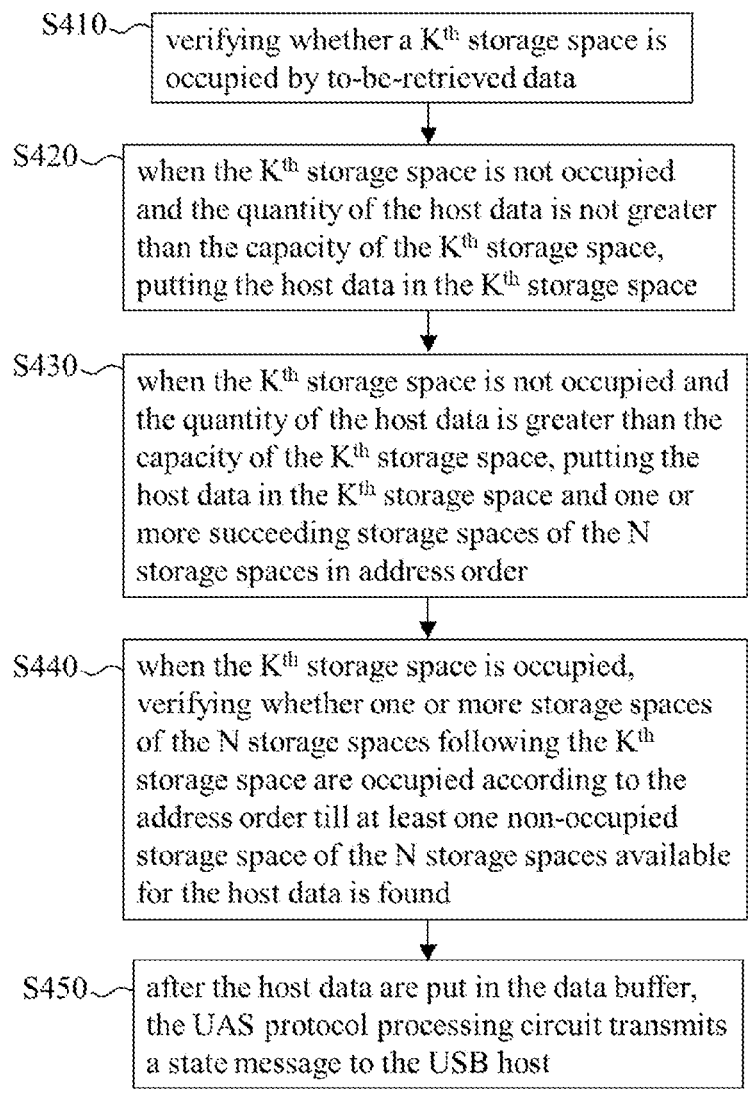
FIG. 4 shows the steps executed by the UAS protocol processing circuit of FIG. 1.

Please refer to FIGS. 1~3b. In an exemplary implementation, after the UAS protocol processing circuit 110 transmits the write-ready signal, the UAS protocol processing circuit 110 executes at least the following steps (as shown in FIG. 4) to put the host data in the data buffer 120:

step S410: verifying whether a $K^{th}$ storage space of the N storage spaces of the data buffer 120 is occupied by to-be-retrieved data.

step S420: when the $K^{th}$ storage space is not occupied and the quantity of the host data is not greater than the capacity of the $K^{th}$ storage space, putting the host data in the $K^{th}$ storage space.

step S430: when the $K^{th}$ storage space is not occupied and the quantity of the host data is greater than the capacity of the $K^{th}$ storage space, putting the host data in the $K^{th}$ storage space and one or more succeeding storage spaces of the N storage spaces in address order (e.g., if K=3, the succeeding storage spaces will be $4^{th}$ storage space, $5^{th}$ storage space, so forth and so on; and if K=N, the succeeding storage spaces will be $1^{st}$ storage space, $2^{nd}$ storage space, so forth and so on). In an exemplary implementation, after the UAS protocol processing circuit 110 puts at least a part of the host data in the $K^{th}$ storage space, the UAS protocol processing circuit 110 modifies the value of a $K^{th}$ effective flag ($V_K$) to indicate that the $K^{th}$ storage space has been used to keep to-be-retrieved data. In an exemplary implementation, a highest ranking and a lowest ranking of the address order are linked to make cyclic order so that the N storage spaces can be used cyclically.

step S440: when the $K^{th}$ storage space is occupied, verifying whether one or more storage spaces of the N storage spaces following the $K^{th}$ storage space are occupied according to the address order till at least one non-occupied storage space of the N storage spaces available for the host data is found.

Step S450: after the host data are successfully put in the data buffer 120, the UAS protocol processing circuit 110 transmits a state message (SENSE IU) to the USB host 12. In an exemplary implementation, the UAS protocol processing circuit 110 transmits the state message to the USB host 12 according to a completion message from the storage device 14. The completion message is discussed in detail in a later paragraph.

Figure 5:
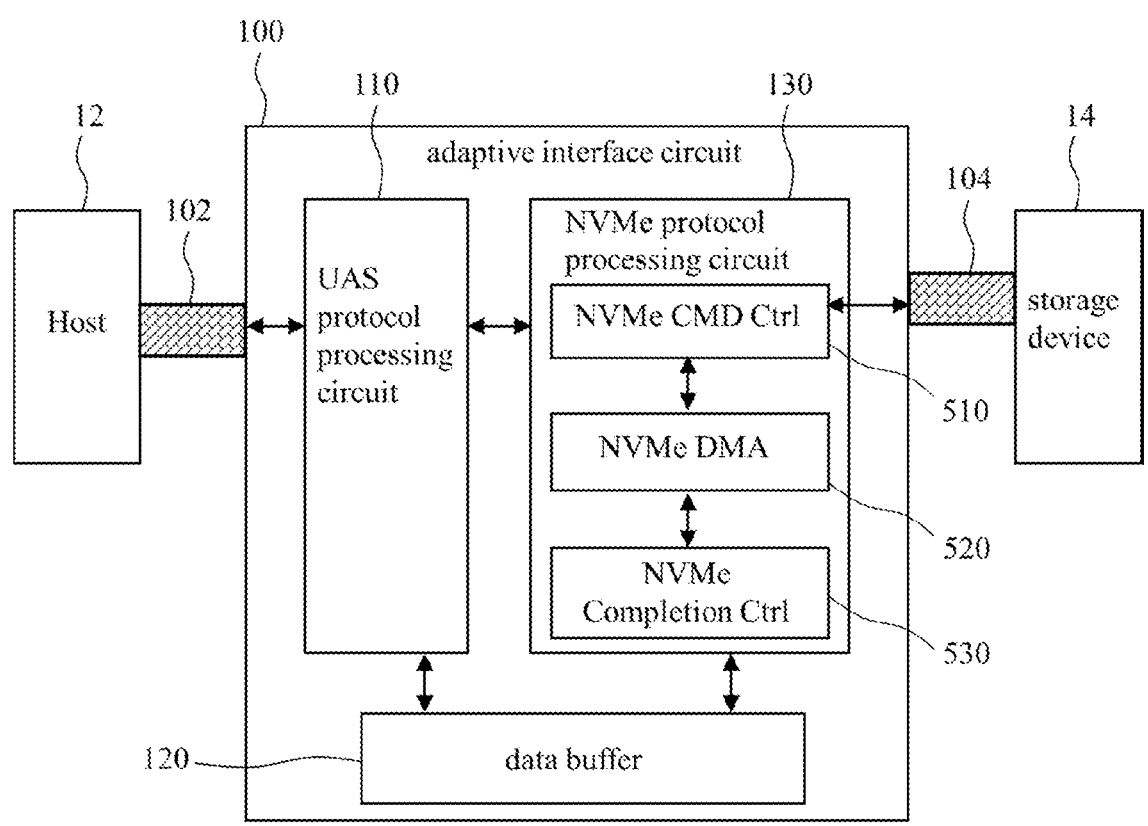
FIG. 5 shows an embodiment of the NVMe protocol processing circuit of FIG. 1.
Figure 6:
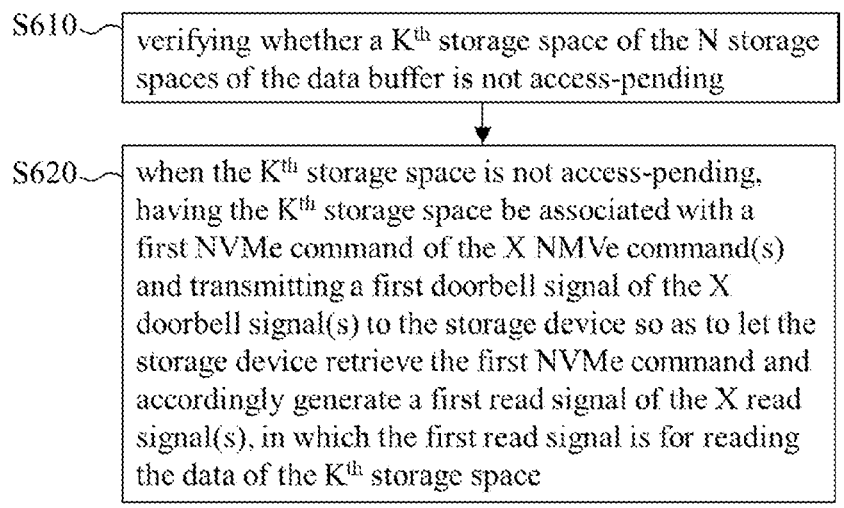
FIG. 6 shows the steps executed by the NVMe command control circuit of FIG. 5.

FIG. 5 shows an embodiment of the NVMe protocol processing circuit 130 of FIG. 1. The NVMe protocol processing circuit 130 of FIG. 5 includes an NVMe command control circuit (NVMe CMD Ctrl) 510, an NVMe direct memory access control circuit (NVMe DMA) 520, and an NVMe completion control circuit (NVMe Completion Ctrl) 530. In an exemplary implementation, the NVMe command control circuit 510 is configured to execute at least the following steps: generating the X NVMe command(s) (e.g., NVMe CMD_1, NVMe CMD_2, so forth and so on as shown in FIG. 2) according to the UAS command; and transmitting the X doorbell signal(s) to the storage device 14 to let the storage device 14 retrieve the X NVMe command(s) from the NVMe protocol processing circuit 110 and generate X read signal(s) accordingly. In an exemplary implementation, the NVMe command control circuit 510 executes at least the following steps (as shown in FIG. 6) to transmit the X doorbell signal(s):

step S610: verifying whether a $K^{th}$ storage space of the N storage spaces of the data buffer 120 is not access-pending.

step S620: when the $K^{th}$ storage space is not access-pending, having the $K^{th}$ storage space be associated with a first NVMe command of the X NVMe command(s) and transmitting a first doorbell signal of the X doorbell signal(s) to the storage device 14 so as to let the storage device 14 retrieve the first NVMe command and accordingly generate a first read signal of the X read signal(s), in which the first read signal is for reading the data of the $K^{th}$ storage space. In an exemplary implementation, after the $K^{th}$ storage space is associated with the first NVMe command, the NVMe command control circuit 510 labels the $K^{th}$ storage space as access-pending.

Please refer to FIG. 5. In an exemplary implementation, the NVMe direct memory access control circuit 520 is configured to output the host data of the data buffer 120 to the storage device 14 according to the X read signal(s). In an exemplary implementation, the NVMe completion control circuit 530 is configured to reset the usage state of a storage space after the data of this storage space is outputted to the storage device 14; for instance, after the data of the $K^{th}$ storage space is outputted to the storage device 14, the NVMe completion control circuit 530 modifies the flags of the $K^{th}$ storage space to label it a storage space without to-be-retrieved data and as not access-pending.

Please refer to FIG. 5. In an exemplary implementation, when the storage device 14 finishes executing an NVMe command(s) or after all of the host data of the data buffer 120 is outputted to the storage device 14, the storage device 14 transmits a completion message (i.e., Write Completion and/or interrupt of FIG. 2) to the NVMe protocol processing circuit 130; afterwards the NVMe completion control circuit 530 resets the usage state of at least a part of the data buffer 120 according to the completion message and transmits a release doorbell signal (Release Doorbell) to the storage device 14. For instance, after the storage device 14 finishes executing the NVMe command associated with the $K^{th}$ storage space, the storage device 14 transmits a completion message to the NVMe protocol processing circuit 130; afterward the NVMe completion control circuit 530 resets the usage state of the $K^{th}$ storage space according to the completion message and transmits a release doorbell signal to the storage device 14 to start the next round of communication or wait for it.

Since the adaptive interface circuit 100 is a digital circuit, people of ordinary skill in the art can realize the digital design and circuit production of the adaptive interface circuit 100 by referring to the present disclosure, the teaching and requirement of the UAS and NVMe protocols, and the known techniques; therefore redundant description is omitted here.

It should be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly.

To sum up, the adaptive interface circuit of the present disclosure can accelerate data access operation by the early transmission of a doorbell signal, and thereby improve the utilization rate of transmission bandwidth.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A circuit for coupling a Universal Serial Bus (USB) interface with a Peripheral Component Interconnect Express (PCIe) interface, the circuit comprising:
   a USB Attached SCSI (UAS) protocol processing circuit;
   a data buffer configured to keep a host data of a host; and
   a Non-Volatile Memory Express (NVMe) protocol processing circuit,
   wherein the UAS protocol processing circuit configured to receive a UAS command from the host via the USB interface and transmit a write-ready signal to the host in response to the UAS command so as to let the host transmit the host data to the data buffer according to the write-ready signal, the UAS protocol processing circuit also configured to provide the UAS command to the NVMe protocol processing circuit,
   wherein the NVMe protocol processing circuit is configured to generate X NVMe command(s) according to the UAS command, and the NVMe protocol processing circuit is configured to start transmitting X doorbell signal(s) to a storage device via the PCIe interface before the host receives the write-ready signal so as to enable the storage device to retrieve the host data from the data buffer according to the X NVMe command(s),
   wherein the X NVMe command(s) are related to the X doorbell signal(s) respectively, and the X is a positive integer;
   wherein the data buffer includes N storage spaces, and the UAS protocol processing circuit executes at least following steps to put the host data in the data buffer:
   verifying whether a $K^{th}$ storage space of the N storage spaces is occupied;
   when the $K^{th}$ storage space is not occupied and quantity of the host data is not greater than capacity of the $K^{th}$ storage space, putting the host data in the $K^{th}$ storage space;
   when the $K^{th}$ storage space is not occupied and the quantity of the host data is greater than the capacity of the $K^{th}$ storage space, putting the host data in the $K^{th}$ storage space and one or more succeeding storage spaces of the N storage spaces in address order;
   when the $K^{th}$ storage space is occupied, verifying whether one or more storage spaces of the N storage spaces following the $K^{th}$ storage space are occupied according to the address order till at least one non-occupied storage space of the N storage spaces available for the host data is found; and
   wherein the N is an integer greater than one, the $K^{th}$ is an ordinal number, and the K is a positive integer not greater than the N.

2. The circuit of claim 1, wherein before the UAS protocol processing circuit transmits the write-ready signal, the NVMe protocol processing circuit starts transmitting the X doorbell signal(s) to the storage device.

3. The circuit of claim 1, wherein a highest ranking and a lowest ranking of the address order are linked to make cyclic order.

4. The circuit of claim 1, wherein the N storage spaces are tagged with N effective flags respectively, and the UAS protocol processing circuit verifies whether the $K^{th}$ storage space is occupied according to a $K^{th}$ effective flag of the N effective flags.

5. The circuit of claim 4, wherein after the UAS protocol processing circuit puts at least a part of the host data is put in the $K^{th}$ storage space, the UAS protocol processing circuit modifies a value of the $K^{th}$ effective flag so as to label the $K^{th}$ storage space as occupied.

6. The circuit of claim 1, wherein after all of the host data are put in the data buffer, the UAS protocol processing circuit transmits a state message to the host.

7. The circuit of claim 6, wherein the UAS protocol processing circuit transmits the state message to the host according to a completion message from the storage device.

8. The circuit of claim 1, wherein the NVMe protocol processing circuit splits the UAS command and thereby generates the X NVMe commands while the X is greater than one.

9. The circuit of claim 1, wherein the NVMe protocol processing circuit includes:
   an NVMe command control circuit configured to execute at least following steps:
   generating the X NVMe command(s) according to the UAS command; and
   transmitting the X doorbell(s) to the storage device to let the storage device retrieve the X NVMe command(s) from the NVMe protocol processing circuit and accordingly generate X read signal(s);
   an NVMe direct memory access control circuit configured to output the host data of the data buffer to the storage device according to the X read signal(s); and
   an NVMe completion control circuit configured to reset a usage state of at least a part of the data buffer after the host data of the data buffer is outputted to the storage device.

10. The circuit of claim 9, wherein the data buffer includes N storage spaces, and the NVMe command control circuit further executes following steps:
   verifying whether a $K^{th}$ storage space of the N storage spaces is not access-pending; and
   when the $K^{th}$ storage space is not access-pending, having the $K^{th}$ storage space be associated with a first NVMe command of the X NMVe command(s) and transmitting a first doorbell signal of the X doorbell signal(s) to the storage device to let the storage device retrieve the first NVMe command and accordingly generate a first read signal of the X read signal(s), in which the first read signal is for reading data of the $K^{th}$ storage space.

11. The circuit of claim 10, wherein the N storage spaces are related to N transmission flags respectively, and the NVMe command control circuit verifies whether the $K^{th}$ storage space is not access-pending according a $K^{th}$ transmission flag of the N transmission flags.

12. The circuit of claim 11, wherein after the $K^{th}$ storage space is associated with the first NVMe command, the NVMe command control circuit modifies a value of the $K^{th}$ transmission flag to label the $K^{th}$ storage space as access pending.

13. The circuit of claim 10, wherein the NVMe completion control circuit resets a usage state of the $K^{th}$ storage space according to a completion message from the storage device and transmits a release doorbell signal to the storage device.

14. A circuit for coupling a first interface with a second interface, the circuit comprising:
a first protocol processing circuit;
a data buffer configured to keep first device data; and
a second protocol processing circuit,
wherein the first protocol processing circuit configured to receive a first protocol command from a first device via the first interface and transmit a write-ready signal to the first device in response to the first protocol command so as to let the first device transmit the first device data to the data buffer according to the write-ready signal, the first protocol processing circuit also configured to provide the first protocol command to the second protocol processing circuit,
wherein the second protocol processing circuit configured to generate X second protocol command(s) according to the first protocol command, and the second protocol processing circuit also configured to start transmitting at least one doorbell signal to a second device via the second interface before the first device receives the write-ready signal so as to let the second device retrieve the first device data from the data buffer according to the X second protocol command(s),
wherein the X is a positive integer; and
wherein the data buffer includes N storage spaces, and the first protocol processing circuit executes at least following steps to put the first device data in the data buffer:
verifying whether a $K^{th}$ storage space of the N storage spaces is occupied;
when the $K^{th}$ storage space is not occupied and quantity of the first device data is not greater than capacity of the $K^{th}$ storage space, putting the first device data in the $K^{th}$ storage space;
when the $K^{th}$ storage space is not occupied and the quantity of the first device data is greater than the capacity of the $K^{th}$ storage space, putting the first device data in the $K^{th}$ storage space and one or more succeeding storage spaces of the N storage spaces in address order;
when the $K^{th}$ storage space is occupied, verifying whether one or more storage spaces of the N storage spaces following the $K^{th}$ storage space are occupied according to the address order till at least one non-occupied storage space of the N storage spaces available for the first device data is found; and
wherein the N is an integer greater than one, the $K^{th}$ is an ordinal number, and the K is a positive integer not greater than the N.

15. The circuit of claim 14, wherein before the first protocol processing circuit transmits the write-ready signal, the second protocol processing circuit starts transmitting the at least one doorbell signal to the second device.

16. The circuit of claim 14, wherein the second protocol processing circuit splits the first protocol command and thereby generates the X second protocol commands while the X is greater than one.

17. The circuit of claim 14, wherein the second protocol processing circuit includes:
a second protocol command control circuit configured to execute at least following steps:
generating the X second protocol command(s) according to the first protocol command; and
transmitting the at least one doorbell signal to the second device to let the second device retrieve the X second protocol command(s) from the second protocol processing circuit and accordingly generate X read signal(s);
a second protocol direct memory access control circuit configured to output the first device data of the data buffer to the second device according to the X read signal(s); and
a second protocol completion control circuit configured to reset a usage state of at least a part of the data buffer after the first device data of the data buffer is outputted to the second device.

18. The circuit of claim 17, wherein the data buffer includes N storage spaces, and the second protocol command control circuit further executes following steps:
verifying whether a $K^{th}$ storage space of the N storage spaces is not access-pending; and
when the $K^{th}$ storage space is not access-pending, having the $K^{th}$ storage space be associated with a command of the X second protocol command(s) and transmitting one of the X doorbell signal(s) to the storage device so as to let the storage device retrieve the command and accordingly generate one of the X read signal(s) for reading data of the $K^{th}$ storage space.

* * * * *